Sept. 3, 1963 W. DILLENBURGER 3,102,927
METHOD AND ARRANGEMENT FOR THE TRANSMISSION OF TELEVISION SIGNALS
Filed Sept. 29, 1960
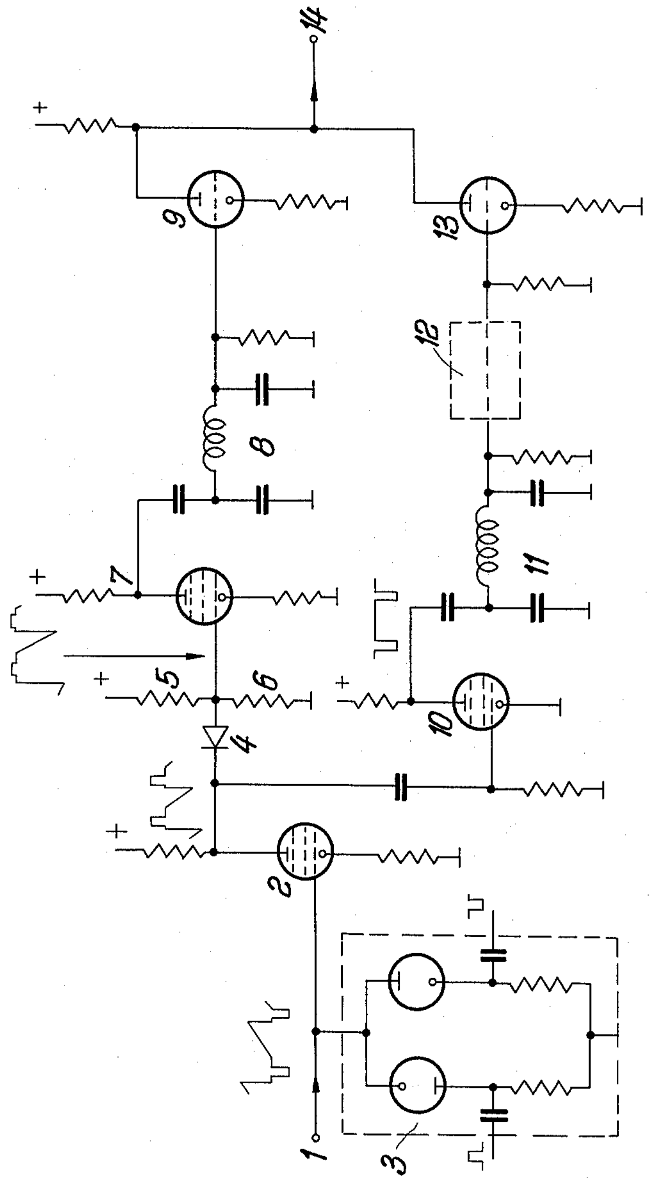
Inventor:
Wolfgang Dillenburger
by Michael S. Striker
Attorney United States Patent Office 3,102,927

Patented Sept. 3, 1963

3,102,927

METHOD AND ARRANGEMENT FOR THE TRANSMISSION OF TELEVISION SIGNALS

Wolfgang Dillenburger, Niederramstadt, near Darmstadt, Germany, assignor to Fernseh G.m.b.H., Darmstadt, Germany Filed Sept. 29, 1960, Ser. No. 59,395
Claims priority, application Germany Oct. 2, 1959
10 Claims. (Cl. 178—69.5)

The invention relates to a method and an arrangement for the transmission of television signals in which the synchronizing signal and the picture signal occupy different ranges of amplitude, and finds application with particular advantage in equipment for the magnetic storage of television signals.

In the storage of television signals on magnetic tape it is usual not to record the television signal directly, but a signal frequency-modulated with the television signal. Thus on the one hand the frequency band is shifted into a band of which the recording on the magnetic tape is possible with adequate efficiency, on the other hand disturbances owing to fluctuations in amplitude of the television signals derived from the tape may be avoided through the employment of amplitude limiting. Since the highest frequency which can be recorded on the magnetic tape is limited on technical and efficiency reasons, it is endeavoured to make the upper limit of the frequency modulated signal intended for recording as low as possible. This implies that the carrier frequency employed is chosen as low as possible; as a rule it lies near by the highest frequency of the television signal.

It is usual to effect the modulation so that the lowest carrier frequency corresponds to the synchronizing signal and the highest carrier frequency to the white level of the television signal. It was suggested, however, that the carrier frequency during the synchronizing signals should not be lower than the highest frequency of the picture signal. As an example, for a maximum video frequency of 5 mc./s. the carrier frequency during the synchronizing intervals may amount to 5.5 mc./s. For a total deviation of e.g. 1.5 mc./s. the carrier frequency then attains a value of 6 mc./s. at the blanking level and for the white level of the television signal one of 7 mc./s. If, in order to reduce the recorded frequency limit, the carrier frequency is so chosen that for a limiting value of the television signal it is smaller than the highest modulating frequency, then interference distortions appear.

To avoid such interference in the transmitted television signal it will in itself be adequate if the carrier frequency for the black level of the picture still lies above the highest frequency of the television signal. For the direction of modulation stated the carrier will then fall within the video band in the black intervals. The synchronizing signal would then be superimposed upon the carrier frequency. Special precautions are then required to obtain the original form of the synchronizing signals again by regeneration. In the mode of operation described, for example, for the stated bandwidth of the video signal, up to 5 mc./s., the carrier frequency for the blanking level could be set at e.g. 0.2 mc./s. above it, that is, at 5.2 mc./s. For the same deviation of 1.5 mc./s. as in the example stated above, there would then result a carrier frequency of 6.2 mc./s. for the white level and one of 4.7 mc./s. for the synchronizing intervals. It is seen that with this carrier setting a very desirable reduction can be obtained in the highest frequency which is to be recorded on the tape, since the highest frequency then amounts to barely 6.2 mc./s., as compared with 7 mc./s. in the previous example. As already explained, however, interference with the synchronizing signal is then not to be avoided, a special amplifier for regeneration is necessary for its abolition.

In general, it is an object of the present invention to avoid this disturbance by a method for improved transmission of television signals, especially in equipment for video tape recording.

A further object of the invention is an arrangement for the processing of the television signal picked up from video tape.

Additional objects of the invention will appear from the following description in conjunction with the accompanying drawing.

The invention depends upon the consideration that a smaller bandwidth suffices for the transmission of the synchronizing signal than for the transmission of the picture signal and that the requirements laid down for the flank steepness of the synchronizing signal can still be adequately fulfilled even on lowering the upper frequency limit of the transmission e.g. from 5 mc./s. to about 2.5 mc./s. If the bandwidth is reduced during the transmission of the synchronizing signal, then during this period the carrier frequency no longer falls within the frequency range of the transmission and therefore cannot give rise to any interference distortion of the synchronizing signal. In an arrangement according to the invention there is thus attained the advantage of being able to lower the upper frequency limit, up to which it is necessary for recording to be carried out in equipments for the magnetic storage of television signals, without there appearing interference distortions of the synchronizing signal, for the abolition of which expensive regenerating devices are necessary.

The practical execution of the arrangement according to the invention can be effected in different manners. For example, the frequency characteristic of an amplifier or of a filter in the signal path may be altered during the period of the synchronizing signal in the direction of a lower limiting frequency by means of a keying signal derived from the synchronizing signal. Another possibility consists in employing an amplifier with a frequency characteristic dependent upon the amplitude. It is true that thus there is not attained any abrupt change of the limiting frequency, nevertheless it may be attained that in the middle of the amplitude range the synchronizing signal is transmitted with smaller bandwidth than the amplitude range of the picture signal. In a preferred embodiment of the invention the synchronizing signal is separated from the television signal and transmitted through a low-pass filter, while the picture signal is transmitted through a parallel path with appropriately higher limiting frequency. The two transmission paths are thereafter combined again to derive again the complete television signal. The two transmission paths should have the same delay time; if necessary a delay equalizer is to be inserted in the path of the picture signal.

As a rule the synchronizing signal added to the picture signal needs no regeneration. For example, as already explained, for the European standard with a bandwidth of 5 mc./s. for the picture signal, a lowering of the bandwidth for the synchronizing signal to 2.5 mc./s. is allowable without the flank steepness being impermissibly reduced. In the worst case, however, the carrier frequency lies above 4 mc./s. during the synchronizing interval, so that the synchronizing signal can be transmitted with more than sufficient bandwidth. Obviously, even with the arrangement according to the invention a regeneration of the synchronizing impulses can be effected for especially stringent requirements, but very simple arrangements are sufficient for this.

The invention will now be further explained with reference to the FIGURE illustrating an exemplary embodiment. The television signal which, for example, appears after the demodulator for the signal taken from magnetic tape is applied to the arrangement at 1 with positive polarity (with negative-going synchronizing signals). It passes to the grid of an amplifier valve 2, the working point of which is stabilized by a clamp circuit 3 for a fixed level of the television signal, as a rule the black level. At the anode of valve 2 the amplified signal appears with negative polarity. The positive-going synchronizing signal is now cut off by a diode 4, which is appropriately biased by a potential divider 5, 6. After the diode 4 there thus apepars only the amplitude range of the picture signal, and this passes by way of a further valve 7 to a phase-corrected frequency-limiting filter section 8 with a cutoff frequency of 5 mc./s.

In a further valve 10 the synchronizing signal is separated from the television signal and appears at the anode of this valve with negative polarity. The synchronizing signal is now taken through a low-pass filter 11 with a cutoff frequency of e.g. 2.5 mc./s. Between the low-pass filter and the following output stage 13 a regeneration of the synchronizing signal can in case of need be effected in the device 12.

The picture signal is likewise applied to an output stage 9. The anodes of the two valves 9 and 13 are connected in parallel, so that at the output the complete television signal is again present.

What is claimed as new and desired to be secured by Letters Patent is:

1. An arrangement for improving in a frequency- modulated carrier transmission system the transmission of television signals modulating the carrier wave and including video signal portions and synchronization signal portions represented by respectively different modulated carrier frequencies, comprising, in combination, input means for introducing a television signal obtained by demodulation of the frequency-modulated carrier wave; means for separating the video signal portions by amplitude clipping from the synchronization signal portions of the demodulated television signal; first channel means for forwarding said separated synchronization signal portions of said demodulated television signals and including means for filtering said synchronization signal portions so as to eliminate therefrom at least a portion of appearing residual oscillations at the higher range of the modulated carrier frequency band representing said synchronization signal portions; second channel means for forwarding said video signal portions of said demodulated television signals; and means for combining said video signal portions forwarded by said second channel means with said filtered synchronization signal portions forwarded by said first channel means so as to reconstruct a complete television signal.

2. An arrangement for improving in a frequency-modulated carrier transmission system the transmission of television signals modulating the carrier wave and including video signal portions and synchronization signal portions, comprising represented by respectively different modulated carrier frequencies, in combination, input means for introducing a television signal obtained by demodulation of the frequency-modulated carrier wave; means for separating the video signal portions by amplitude clipping from the demodulated synchronization signal portions of the television signal; first channel means for forwarding said separated synchronization signal portions of said demodulated television signals and including low-pass filter means having a cut-off frequency lower than the highest frequency of the television signal for filtering said synchronization signal portions so as to eliminate therefrom at least a portion of appearing residual oscillations at the higher range of the modulated carrier frequency band representing said synchronization signal portions; second channel means for forwarding said video signal portions of said demodulated television signals; and means for combining said video signal portions forwarded by said second channel means with said filtered synchronization signal portions forwarded by said first channel means so as to reconstruct a complete television signal.

3. In a frequency-modulated carrier transmission system of television signals modulating the carrier frequency and including video signal portions and synchronization signal portions, the method of improving the transmission of the television signals obtained by demodulation of the frequency-modulated carrier wave, comprising the steps of: using a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals; separating in the television signals obtained by demodulation the video signal portions from the synchronization signal portions in accordance with their respective amplitudes appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered synchronization signal portions of said demodulated signals so as to reconstruct the complete television signals, whereby interferences between a carrier frequency and said synchronization signal portions are prevented.

4. In a frequency-modulated carrier transmission system of television signals modulating the carrier frequency and including video signal portions occupying a first amplitude range and synchronization signal portions occupying a secod amplitude range, the method of improving the transmission of the television signals obtained by demodulation of the frequency-modulated carrier wave, comprising the steps of: using a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals; separating in the television signals obtained by demodulation the video signal portions from the synchronization signal portions in accordance with their respective amplitude ranges appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered synchronization signal portions of said demodulated signals so as to reconstruct the complete television signals, whereby interferences between a carrier frequency and said synchronization signal portions are prevented.

5. In a frequency-modulated carrier transmission system of television signals modulating the carrier frequency and including video signal portions occupying a first amplitude range and synchronization signal portions occupying a second amplitude range, the method of improving the transmission of the television signals obtained by demodulation of the frequency-modulated carrier wave, comprising the steps of: using a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals, the lowest frequency range within the swing of the carrier frequency modulation being assigned to transmitting the synchronization signal portions, and the highest frequency range within said swing being assigned to the white level portion of the video signal portions; separating in the television signals obtained by demodulation the video signal portions from the synchronization signal portions in accordance with their respective amplitude ranges appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered sychronization signal portions of said demodulated signals so as to reconstruct the complete television signals, whereby interferences between a carrier frequency and said synchronization signal portions are prevented.

6. In a frequency-modulated carrier transmission system of television signals modulating the carrier frequency and including video signal portions and synchronization signal portions, the method of improving the transmission of tape recorded television signals after the demodulation of the frequency-modulated carrier wave recorded on the tape, comprising the steps of: using in the tape recording a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals; separating in the television signals obtained by demodulation the video signal portions from the synchronization signal portions in accordance with their respective amplitudes appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered synchronization signal portions of said demodulated signals so as to reconstruct the complete television signals, whereby a higher quality tape recording is effected and interferences between a carrier frequency and said synchronization signal portions are prevented.

7. In a frequency-modulated carrier transmission system of television signals modulating the carrier frequency and including video signal portions occupying a first amplitude range and synchronization signal portions occupying a second amplitude range, the method of improving the transmission of tape recorded television signals after the demodulation of the frequency-modulated carrier wave recorded on the tape, comprising the steps of: using in the tape recording a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals; separating in the television signals obtained by demodulation the video signal portions from the synchronization signal portions in accordance with their respective amplitude ranges appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered sychronization signal portions of said demodulated signals so as to reconstruct the complete television signals, whereby a higher quality tape recording is effected and interferences between a carrier frequency and said synchronization signal portions are prevented.

8. In a frequency-modulated carrier transmission system of television signals modulating the carrier frequency and including video signal portions occupying a first amplitude range and synchronization signal portions occupying a second amplitude range, the method of improving the transmission of tape recorded television signals after the demodulation of the frequency-modulated carrier wave recorded on the tape, comprising the steps of: using in the tape recording a basic carrier frequency lower than the highest frequency used in the video signal portions of the modulating television signals; limiting the swing of the frequency modulation corresponding to the synchronization signal portions to a bandwidth smaller than that of the swing of the frequency modulation corresponding to the video signal portions of the modulating television signals, the lowest frequency range within the swing of the carrier frequency modulation being assigned to transmitting the synchronization signal portions, and the highest frequency range within said swing being assigned to the white level portion of the video signal portions; separating in the television signals obtained by demodulation the video signal portions from the synchronization signal portions in accordance with their respective amplitude ranges appearing in said television signals after demodulation; filtering said synchronization signal portions of the demodulated signals so as to eliminate therefrom at least a portion of appearing residual oscillations at the higher range of the modulated carrier frequency band representing said synchronization signals; and recombining said video signal portions and said filtered synchronization signal portions of said demodulated signals so as to reconstruct the complete television signals, whereby a higher quality tape recording is effected and interferences between a carrier frequency and said synchronization signal portions are prevented.

9. An arrangement for improving in a frequency-modulated carrier system the transmission of television signals obtained by demodulation of frequency-modulated signals picked up from a video tape recording and including video signal portions and synchronization signal portions represented in the recorded modulated carrier wave by respectively different modulated carrier frequencies, comprising, in combination, input means for introducing the television signals obtained by demodulation of the tape recorded frequency-modulated carrier wave; means for separating the video signal portions by amplitude clipping from the synchronization signal portions of the demodulated television signal; first channel means for forwarding said separated synchronization signal portions of said demodulated television signals and including means for filtering said synchronization signal portions so as to eliminate therefrom at least a portion of appearing residual oscillations at the higher range of the modulated carrier frequency band representing said synchronization signal portions; second channel means for forwarding said video signal portions of said demodulated television signals; and means for combining said video signal portions forwarded by said second channel means with said filtered synchronization signal portions forwarded by said first channel means so as to reconstruct a complete television signal.

10. An arrangement for improving in a frequency-modulated carrier system the transmission of television signals obtained by demodulation of frequency-modulated signals picked up from a video tape recording and including video signal portions and synchronization signal portions represented in the recorded modulated carrier wave by respectively different modulated carrier frequencies, comprising, in combination, input means for introducing the television signals obtained by demodulation of the tape recorded frequency-modulated carrier wave; means for separating the video signal portions by amplitude-clipping from the synchronization signal portions of the demodulated television signal; first channel means for forwarding said separated synchronization signal portions of said demodulated television signals and including low-pass filter means having a cut-off frequency lower than the highest frequency of the television signal for filtering said synchronization signal portions so as to eliminate therefrom at least a portion of appearing residual oscillations at the higher range of the modulated carrier frequency band representing said synchronization signal portions; second channel means for forwarding said video signal portions of said demodulated television signals; and means for combining said video signal portions forwarded by said second channel means with said filtered synchronization signal portions forwarded by said first channel means so as to reconstruct a complete television signal.

References Cited in the file of this patent

UNITED STATES PATENTS

| | | |
|---|---|---|
| 2,403,059 | Dillenback et al. | July 2, 1946 |
| 2,492,943 | White | Dec. 27, 1949 |
| 2,909,596 | Fay | Oct. 20, 1959 |
| 2,941,032 | Geiger et al. | June 14, 1960 |
| 2,956,114 | Ginsburg et al. | Oct. 11, 1960 |
| 2,958,735 | Maier et al. | Nov. 1, 1960 |